Oct. 17, 1967

R. A. VEITCH 3,348,179

WINDING HAVING IMPROVED SURGE POTENTIAL DISTRIBUTION

Filed March 8, 1966

WITNESSES:
Bernard R. Gregory
James T. Young

INVENTOR
Robert A. Veitch
BY
Donald R. Lackey
ATTORNEY

United States Patent Office

3,348,179
Patented Oct. 17, 1967

3,348,179
WINDING HAVING IMPROVED SURGE
POTENTIAL DISTRIBUTION
Robert A. Veitch, Burlington, Ontario, Canada, assignor to Canadian Westinghouse Company, Limited, Hamilton, Ontario, Canada
Filed Mar. 8, 1966, Ser. No. 532,641
8 Claims. (Cl. 336—58)

ABSTRACT OF THE DISCLOSURE

An electrical winding structure having a plurality of spaced, electrically connected pancake coils, with solid and fluid insulating means having different dielectric constants being disposed in the spaces between the pancake coils. The ratio of solid to fluid insulating means, taken on a line substantially perpendicular to the major surfaces of the pancake coils, varies from pancake coil to pancake coil across the winding, to vary the effective dielectric constant from pancake coil to pancake coil in a manner which improves the distribution of surge potentials across the winding.

---

When a surge potential is applied to the line end of a winding for electrical inductive apparatus, its initial distribution across the winding from the line to the neutral end is capacitive, depending upon the arrangement of the electrical conductors which make up the winding, and the insulation between the conductors. This capacitive distribution of the voltage is usually quite different than the inductive or steady state distribution, causing large transient oscillatory voltages to be produced as the voltage distribution changes from capacitive to inductive. The designer of the electrical apparatus, therefore, attempts to provide a winding which has a capacitive distribution as similar to the inductive distribution as possible, which reduces transient voltage oscillations to a minimum. It is important to reduce transient voltage oscillations to a minimum, as adding additional insulation to protect the apparatus from large transient voltages increases the mean length of the winding turns and the mean length of the magnetic circuit, which increases the copper and iron requirements accordingly, and which deleteriously affects the cost, size, regulation and efficiency of the apparatus.

Unfortunately, other equally important considerations work against the desired result of obtaining similar capacitive and inductive voltage distribution curves across the winding. For example, in high voltage transformers which utilize a plurality of pancake or disc type coils stacked in spaced side-by-side relation to provide insulation clearances between coils and provide ducts between the coils for cooling them with an insulating fluid, and which are electrically connected to form a winding, it is advantageous to grade the insulation from the various coils to the grounded magnetic core. In other words, the coils near the line end of the winding are made smaller in outside diameter and have a larger opening for receiving the magnetic core than the coils nearer the neutral or grounded end of the winding, in order to provide clearances from the coil to ground dependent upon the particular voltage level of the coil. Since the capacitance between adjacent pancake coils depends upon the surface area of the smaller of any two adjacent coils, the capacitance between the smaller coils near the line end of the winding is substantially less than the capacitance between the larger coils near the neutral end of the winding, with the capacitance increasing from coil pair to coil pair across the windings from the line to the neutral end. Since capacitive reactance is inversely proportional to capacitance, a surge potential applied to the line end of the winding which utilizes graded insulation will be very poorly distributed across the winding, with the stresses across the spaces between the coils at the line end of the winding being much higher than across the spaces between the coils at the neutral end of the winding. In order to accommodate the extra stresses at the line end of the winding, the spaces or ducts between the line end coils are often increased in width. This, however, further reduces the capacitance between these coils, resulting in an even poorer impulse distribution, which partially nullifies the effect of increasing the space between the line end coils. Thus, it would be desirable to provide a winding structure which provides a capacitive or impulse voltage distribution across a winding which is similar to the inductive or steady state voltage distribution, and which is applicable to windings which use graded insulation from the coils which make up the electrical winding to the adjacent grounded structure.

Accordingly, it is an object of the invention to provide a new and improved winding structure for electrical inductive apparatus.

Another object of the invention is to provide a new and improved winding structure for electrical inductive apparatus in which the capacitive distribution of surge potentials across the winding is similar to the inductive distribution of potential across the winding.

A further object of the invention is to provide a new and improved winding structure for electrical inductive apparatus in which the insulation from the winding coils to ground is graded, and which provides substantially similar capacitive and inductive voltage distributions across the winding.

Briefly, the invention accomplishes the above-cited objects by controlling the ratio of solid electrical insulation material to fluid electrical insulating material in the space between adjacent coils across the winding. In the prior art, this space includes a plurality of thin washer members formed of pressboard, or other suitable electrical insulating material, which have a plurality of discrete insulating spacer members or blocks attached thereto to provide ducts for the circulation of a cooling fluid, such as oil. Since the distances between adjacent coils are substantially constant, and since the ratio of solid electrical insulation material to fluid insulating material taken along a line substantially perpendicular to the plane of the pancake coils, is substantially constant, the dielectric constant of the insulating medium between coils is substantially constant and the capacitance between adjacent pancake coils is therefore directly proportional to the surface area of one of the major sides of the smallest coil of the pair. This invention offsets the coil size change across the winding by a corresponding change in the dielectric constant of the insulating space between the coils. The solid and fluid electrical insulating materials are selected to each have a different dielectric constant. Thus, by changing the ratio of solid to fluid electrical insulating material in the spaces between the electrical coils in a predetermined manner as the coil surface areas change across the winding, a predetermined capacitive relationship across the winding may be obtained. For example, the capacitance between each adjacent pair of coils may be made substantially equal, if desired. Using the conventional pressboard, which has a dielectric constant when saturated with insulating oil of 4.5, and an insulating oil for the fluid, which has a dielectric constant of 2.2, the ratio of solid to fluid electrical insulating material would be a maximum at the line end of the winding using graded insulation, and a minimum at the neutral end, changing the effective dielectric constant of the insulating medium between adjacent coils from substantially 4.5 to 2.2 across the winding from the line to the neutral end. By using materials for the solid and fluid having different dielectric constants than pressboard and oil, other ranges of dielectric constant may be obtained.

Further objects and advantages of the invention will become apparent from the following detailed description, taken in connection with the accompanying drawings, in which.

In high voltage electrical inductive apparatus of the type which utilizes a plurality of electrically connected pancake or disc type coils to form a winding, one end of which is adapted for connection to a source of alternating potential, and the other end of which is the neutral end, which may be grounded, advantage is usually taken of the reduced potential to the grounded magnetic core as the winding progresses from the line to the neutral end of the winding, to grade the insulation accordingly. The electrical coils are spaced to provide electrical clearance between the coils and to provide ducts for cooling the coils with a fluid dielectric, which may be a gas, such as $SF_6$, or a liquid, such as oil. The cooling ducts are formed by flat insulating washers with spacer blocks attached, forming an insulating medium between any two adjacent coils which has substantially the same dielectric constant as the insulating medium between any other two adjacent coils.

The capacitance between any two adjacent coils, with the coils forming the plates of the "capacitor," is determined by the formula:

$$C = .2249 \frac{KA}{d}$$

where C is the capacitance in micromicrofarads, A is the area of one of the "plates" or major coil surfaces in square inches, $d$ is the distance between the plates or coil surfaces in inches, and K is the dielectric constant of the insulating medium separating the major surfaces of the coils. In a high voltage winding using graded insulation, the coil size and therefore surface area increases from the line end of the coil to the neutral end, the distance $d$ between the coils is substantially constant, and the effective dielectric constant of the insulation between the coils is substantially constant. Thus, the capacitance between adjacent coils increases with the increase in surface area of the coils from the line to the neutral end of the winding, providing a poor distribution of transient voltages across the winding, stressing the space between the line end coils much greater than the remaining spaces, and producing transient voltage oscillations when a surge potential is applied to the line end of the winding, as hereinbefore described.

Figure 1:
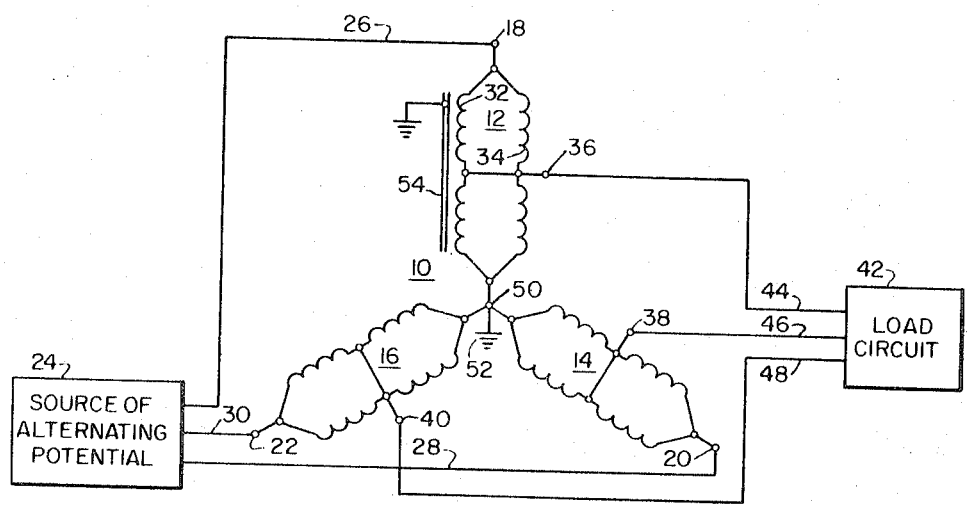
FIGURE 1 is a schematic diagram of the type of electrical inductive apparatus which may effectively utilize the teachings of the invention.
Figure 2:
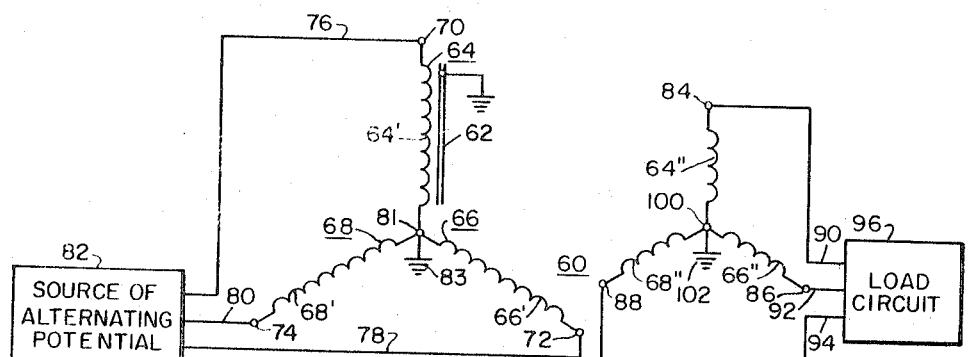
FIG. 2 is a schematic diagram of still another type of electrical inductive apparatus which may utilize the teachings of the invention.

Examples of transformers which may be constructed in this manner are shown in FIGS. 1 and 2. FIG. 1 is a schematic diagram of an autotransformer 10, which may be a single three-phase transformer with all of the windings disposed on a common magnetic core 54, or three single-phase transformers in which the electrical windings are disposed on three separate magnetic cores, connected in a three-phase Y configuration. Autotransformer 10 has phases 12, 14 and 16, each having a line end having terminals 18, 20 and 22, respectively, connected to a source 24 of alternating potential through electrical conductors 26, 28 and 30, respectively. Each electrical phase may have one or more windings, as required by the particular application, such as the parallel connected windings 32 and 34 in electrical phase 12. Each electrical phase 12, 14 and 16 has a low voltage tap connection 36, 38 and 40, respectively, connected at a predetermined point intermediate the ends of the phase winding, which are connected to a load circuit 42 through electrical conductors 44, 46 and 48, respectively. The remaining ends of the electrical phases 12, 14 and 16, are connected in common at neutral point 50, which may be grounded at 52, if desired. Thus, each phase has one or more windings, such as the two illustrated in FIG. 1, connected from a line terminal to a neutral terminal, and the coils which make up each electrical winding may advantageously use graded insulation from the coils to the grounded magnetic core, shown generally at 54.

FIG. 2 is included to illustrate that a transformer having isolated high and low voltage windings may also be constructed in the hereinbefore described manner, using graded insulation. FIG. 2 is a schematic diagram of a transformer 60 which may be a single three-phase transformer, in which the windings are disposed on a magnetic core 62, or three single-phase transformers which are connected in a three-phase Y configuration. Transformer 60 has electrical phase 64 which has high and low voltage windings 64′ and 64″, respectively, an electrical phase 66 which has high and low voltage windings 66′ and 66″, and an electrical phase 68 which has high and low voltage windings 68′ and 68″. The high voltage windings 64′, 66′ and 68′ each have a line end having terminals 70, 72 and 74, respectively, connected to a source 82 of alternating potential through electrical conductors 76, 78 and 80, respectively. The remaining ends of the high voltage windings are connected in common to neutral point 81, which may be grounded at 83, if desired.

Low voltage windings 64″, 66″ and 68″ may be connected in Y as shown, or in delta. If connected in Y, as shown, each low voltage winding 64″, 66″ and 68″ has a line end having terminals 84, 86 and 88, respectively, connected to a load circuit 96 through electrical conductors 90, 92 and 94, respectively. The remaining ends are connected to a common neutral point 100, which may be grounded at 102.

While the transformers 10 and 60 shown in FIGS. 1 and 2 are illustrated as being stepdown transformers, the load circuit and source of electrical potential may have their respective positions reversed to make them stepup transformers, if desired. Also, it should be understood that the transformers shown in FIGS. 1 and 2 are for illustration only with the invention, in general, being applicable to any winding structure which employs a combination of fluid and solid electrical insulation between adjacent coils.

Figure 3:
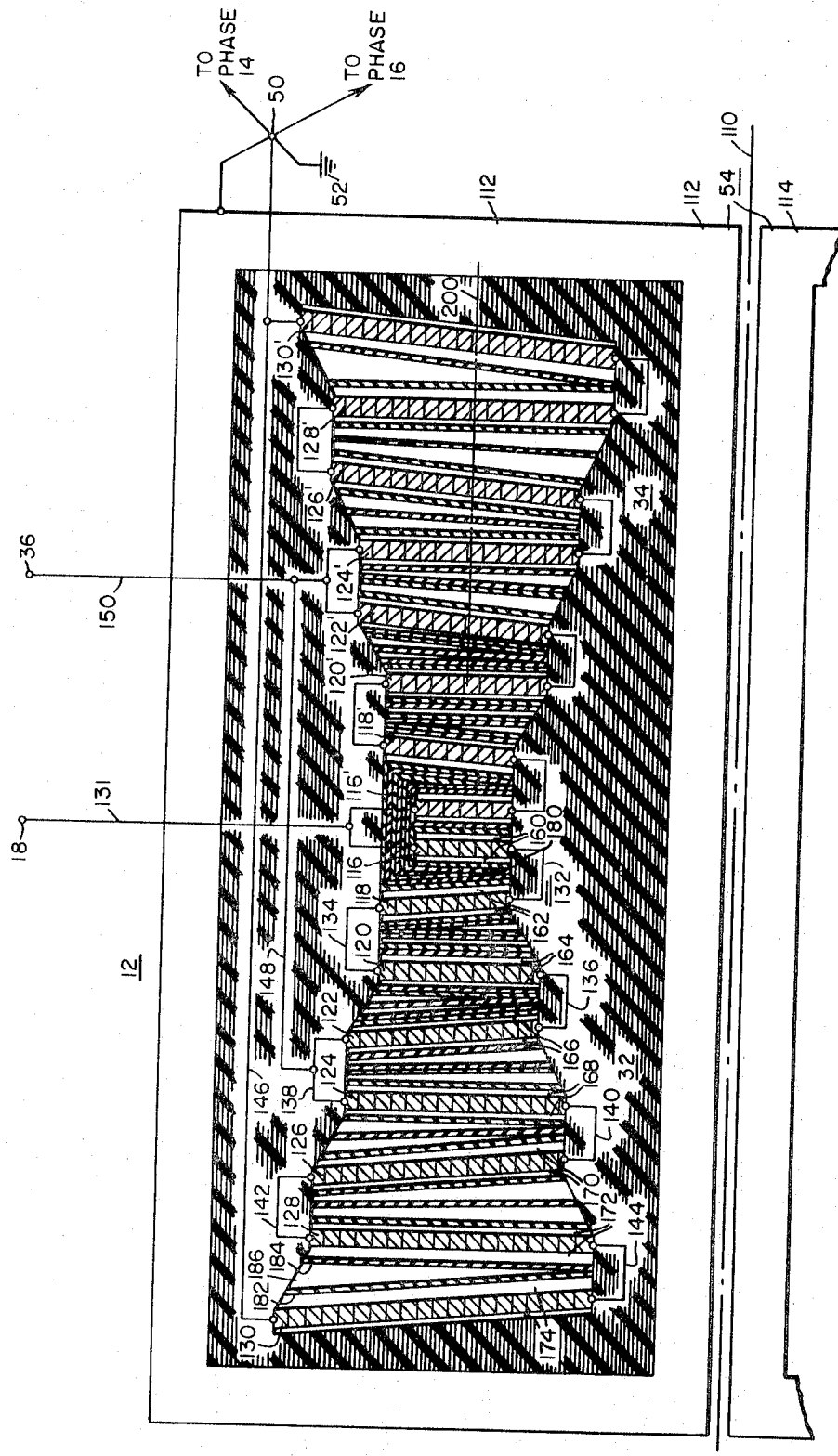
FIG. 3 is a fragmentary plan view, in section, of an electrical transformer constructed according to the teachings of the invention.

In order to clearly describe the invention, one of the electrical phases, such as phase 12 of transformer 10 is illustrated in a fragmentary plan view, in section, in FIG. 3.

Electrical phase 12 of transformer 10 includes windings 32 and 34, each having a plurality of serially connected pancake or disc type coils. Since each electrical winding 32 and 34 is similar, only one will be described in detail, such as winding 32. Also, since the electrical phase has two similar sections in a plan view, only one section is shown in FIG. 3 for purposes of simplifying the drawing. In other words, the views on opposite sides of center line 110 in FIG. 3 would be mirror images of one another.

In this embodiment of the ivention, electrical phase 12 is constructed in the well known shell-form manner, in which the windings inductively link two similar sections of the magnetic core 54, such as sections 112 and 114. The invention is equally applicable to transformers of the core-form type, if they use a combination of fluid and solid insulation between the adjacent coils which make up a winding. Each of the windings 32 and 34 include a plurality of pancake type coils, such as coils 116, 118, 120, 122, 124, 126, 128 and 130 in winding 32, and similar coils indicated with the same reference numerals with a prime mark in winding 34. Each pancake coil includes a plurality of radially spaced turns, with each turn having one or more conductor strands, wound about an opening for receiving the magnetic core 54. Calling the end of the innermost turn, adjacent the opening for receiving the magnetic core, the "start" end of the coil, and the end of the outermost turn the "finish" end of the coil, the coils are wound in a radial manner to form substantially flat pancake coils in some instances, and substantially conically-shaped pancake coils in other instances. The flat and conically shaped coils may be disposed alternately, as shown in FIG. 3, and serially connected "start-start" and "finish-finish," which provides minimum clearances between adjacent coils at the ends where they are interconnected, and at substantially the same potential, and progressively greater clearances as the coils proceed to their other ends, where the difference in potential is the greatest. For example, pancake coil 116, which is the line end coil of winding 32, has the end of its outermost turn connected to terminal 18 via conductor 131, which is adapted for connection to a source of alternating potential, and this coil may be substantially flat. The adjacent coil 118 may be conically shaped, and disposed such that its "start" end is closer to the "start" end of coil 116 than its "finish" end is the "finish" end of coil 116. The "start" ends of coils 116 and 118 are electrically connected via conductor 132. The next pancake coil 120, may be substantially flat, with its "finish" end connected to the "finish" end of coil 118 via conductor 134, which are progressively separated a greater distance as they proceed toward their "start" ends. Coil 122 is conically shaped and disposed with its "start" end adjacent to and electrically connected to the "start" end of coil 120 via conductor 136. Coil 124 is substantially flat, with its "finish" end being disposed adjacent to and electrically connected to the "finish" end of coil 122 via conductor 138. The next coil 126, is substantially conically shaped and disposed with its "start" end adjacent to and electrically connected to the "start" end of coil 124 via conductor 140. The next coil 128 is substantially flat and has its "finish" end disposed adjacent to and electrically connected to the "finish" end of coil 126 via conductor 142, and the last coil 130 is conically shaped, and disposed with its "start" end adjacent to and electrically connected to the "start" end of coil 128 via conductor 144. The "finish" end of coil 130 is electrically connected to the neutral point 50 via conductor 146, and the neutral point is connected to the neutral end of the remaining phase windings. One of the interconnecting conductors, such as conductor 138, may be connected to the low voltage terminal 36 via conductors 148 and 150, as shown.

Thus, each electrical coil is substantially pancake or disc shaped, and may be flat or conical, forming two major opposed surfaces, and an opening which extends between the major surfaces. It is these major surfaces which form the "plates" of the capacitance between adjacent pancake coils.

While the electrical coils in FIG. 3 are illustrated as being alternately flat and conical, this arrangement is merely for illustrative purposes. The invention is equally applicable to all flat pancake coils, all conical, or any other suitable configuration and arrangement.

If all of the pancake coils were to be uniform in their dimensions, having the same size opening and the same outer dimensions, the number of turns in each pancake coil would be limited to the number of turns in the line end coil, as the line end coil has the greatest potential to ground, and would require the greatest clearances from the coil to the grounded magnetic circuit. Thus, more pancake coils would be required in the winding to obtain a predetermined number of turns than would be required if the insulation clearances from each coil to ground were graded according to the potential of the particular coil. Since additional coils would increase the length of the winding and thus the length of the magnetic circuit, it is advantageous in high voltage transformers to grade the insulation. Thus, the major surface area of pancake coil 116 connected to the line is much less than the major surface area of the pancake coil 130 connected to the neutral connection 50, with the major surface areas of the coils increasing in a predetermined manner from the line to the neutral end of the winding.

Assuming the distances between adjacent coils to be substantially the same, and the dielectric constant of the insulating medium between adjacent coils to be substantially the same, the capacitance between coils 116 and 118 would be determined by the major surface area of one side of coil 16, since it is less than the major surface area of coil 118. Thus, as the surface areas of the coils increases from the line to a neutral end of the winding, the capacitance between adjacent coils increases from the line to the neutral end of the winding, which provides the greatest capacitive reactance between coils 116 and 118 and the least capacitive reactance between coils 128 and 130. The capacitive voltage distribution thus distributes surge potentials unevenly across the winding, stressing the space between coils 116 and 118 much more severely than the space between coils 128 and 130. The inductive voltage distribution, on the other hand, has the least voltage drop across the line end coil 116, and the greatest across the neutral end coil, since the number of turns in the line end coil is less than in the neutral end coil. This great difference in the transient and steady state voltage distributions across the winding should be avoided, in order to reduce the stresses at the line end of the coil, and reduce transient voltage oscillations to an absolute minimum.

In order to remove heat generated in the coils by flow of electrical current therethrough, coil cooling ducts are essential, and they are placed immediately adjacent each side or major surface of each coil. For example, coil 116 has coil ducts 160 disposed immediately adjacent each major surface. In like manner, coil 118 has coil ducts 162, coil 120 has coil ducts 164, coil 122 has coil ducts 166, coil 124 has coil ducts 168, coil 126 has coil ducts 170, coil 128 has coil ducts 172, and coil 130 has coil ducts 174. A cooling and insulating fluid, liquid or gas, is disposed in the coil ducts which circulates through the ducts to remove the heat from the coils and then through external heat exchanger means, in a continuous cycle. These coil ducts are formed in the prior art by thin insulating washer members of pressboard having insulating spacer blocks attached thereto. In the prior art, additional washers with spacer blocks may also be disposed in the space between the washers which form the coil ducts, in a uniform manner from coil to coil, forming additional flow paths for the cooling and insulating fluid.

The only effective flow paths for the coolant, however, are those disposed immediately adjacent the major coil surfaces. Therefore, the additional space between coils may be effectively utilized to control the dielectric constant between adjacent coil sections, and therefore control the capacitance between the coil sections within a predetermined range. To increase the dielectric constant and therefore the capacitance between the two coil sections, additional solid insulation such as pressboard having a dielectric constant of 4.5, is added to the space between the windings. To decrease the dielectric constant and therefore the capacitance between adjacent coils, less solid insulation is used between adjacent coils which, therefore, introduces more of the fluid insulation such as oil, having a dielectric constant of 2.2. In other words, using pressboard and oil for the insulating materials, the ratio of pressboard to oil should be a maximum when it is desired to have the maximum dielectric constant, and the ratio of pressboard or oil should be a minimum where it is desired to have the minimum dielectric constant.

In the arrangement shown in FIG. 3, it would be desirable to increase the dielectric constant of the insulation between the coils near the line end of the winding and decrease the dielectric constant of the insulation between the coils near the neutral end of the winding. Thus, in the space between coils 116 and 118, the coil ducts 160 and 162 may be formed with insulating washers having spacers on one side thereof, and the remaining space between the coils may be completely filled with solid insulation, as indicated at 180. Thus the dielectric constant between coils 116 and 118 would be the maximum obtainable using oil and pressboard. Since the effective surface area between coils 118 and 120 is larger than between coils 116 and 118, the dielectric constant of the insulation between coils 118 and 120 may be lower than that between coils 116 and 118. This may be accomplished by forming the coil ducts 164 and 162 between the coils, and filling the remaining space with pressboard which has additional narrow oil ducts therein. This procedure is followed from coil to coil, gradually providing more oil ducts, and/or increasing the width of the oil ducts, until only the washers required to provide the coil ducts are utilized, such as washers 182 and 184 which form coil ducts 174 and 172, respectively, between coils 130 and 128. The remaining space 186 between washers 182 and 184 would be filled with the insulating oil.

The dielectric constant between each pair of adjacent coils may be changed to exactly offset the change in the "plate" dimension of the capacitor, formed by the surfaces of the coils, to provide substantially the same capacitance between each pair of coils. This would be desirable if the inductive voltage distribution across each coil is substantially the same and the capacitance of coils to ground is not considered. If the sizes of the coils vary substantially, such that the inductive distribution across each coil is not the same, then the capacitance between each adjacent pair of coils may be adjusted, using the proper ratio of solid to fluid insulation, to obtain a capacitive voltage distribution which more nearly coincides with the inductive distribution. Due to the capacitance of the coils to ground, it may actually be more desirable to have a higher capacitance between the ducts at the line end of the winding than at the neutral end, which would promote a more linear capacitive voltage distribution across the winding. In any event, in inductive apparatus which uses graded insulation from the coils to ground, and using a solid insulation which has a higher dielectric constant than the fluid insulation, the ratio of solid to fluid insulation would be the maximum between the first two coils from the line end of the winding, and the minimum between the two coils nearest the neutral end of the winding, and will vary between these two figures, with the ratio becoming smaller as the winding progresses from the line to the neutral end of the winding.

In summary, there has been disclosed a new and improved winding structure for electrical inductive apparatus which allows the capacitive distribution of surge potential across an electrical winding to be adjusted to more nearly conform with the inductive or steady state distribution of potential across the winding. This is accomplished by controlling the dielectric constant, and therefore the capacitance, between adjacent coils by selecting the ratio of solid to fluid insulation, with the ratio being taken along the imaginary line or plane which is substantially perpendicular to the plane of the coils, or substantially parallel with the opening in the winding. In determining the ratio of solid to fluid insulation for purposes of controlling the dielectric constant, it would not be proper to use a ratio of their total volumes, as when the coils become larger, using a predetermined number of spaced thin barrier members between each pair of adjacent coils, as taught by the prior art, the ratio of the volume of solid insulation to fluid insulation would decrease, but it would have very little affect on the effective dielectric constant of the insulating medium. Therefore, in order to define a ratio of solid to fluid insulation which would have a substantial affect on the dielectric constant, it is necessary to define the ratio as being taken along an imaginary plane which is substantially perpendicular to the plane of the coils or parallel with the opening in the winding. For example, as shown in FIG. 3, the ratio may be taken along the line or plane 200, shown cutting the flat coils of winding 34 in a substantially perpendicular manner.

Since numerous changes may be made in the above described apparatus and different embodiments of the invention may be made without departing from the spirit thereof, it is intended that all matter contained in the foregoing description or shown in the accompanying drawings shall be interpreted as illustrative and not in a limiting sense.

I claim as my invention:

1. An electrical winding having a line end adapted for connection to a source of electrical potential, a neutral end, and an opening for receiving a magnetic core, comprising a plurality of electrically connected pancake coils each having two major opposed surfaces and an opening which extends between the major opposed surfaces; said plurality of pancake coils being disposed in spaced side-by side relation with their openings in substantial alignment, forming the opening in the electrical winding; solid electrical insulating means having a first predetermined dielectric constant disposed in the space between the major surfaces of each pair of adjacent coils; said solid electrical insulating means forming ducts between each pair of spaced coils; fluid electrical insulating means having a second dielectric constant, different than the dielectric constant of said solid electrical insulating means, disposed in the ducts formed between each pair of spaced coils; the ratio of the electrical insulating means having the higher dielectric constant to the electrical insulating means having the lower dielectric constant, taken along a plane which passes through all of the coils in a direction substantially parallel with the opening in the winding, decreasing from coil to coil across the winding from the line to the neutral end in a predetermined manner, providing a predetermined effective dielectric constant which decreases from coil to coil, to provide an improved distribution of surge potentials across the winding from the line to the neutral end.

2. The electrical winding of claim 1 wherein the dielectric constant of said solid electrical insulating means is greater than the dielectric constant of said fluid electrical insulating means.

3. The electrical winding of claim 1 wherein the effective adjacent area of the major surfaces of certain pairs of adjacent coils increases from the line end to the neutral end of the winding.

4. The electrical winding of claim 2 wherein the effective adjacent area of the major surfaces of certain pairs of adjacent coils increases from the line end to the neutral end of the winding.

5. The electrical winding of claim 2 wherein the effective adjacent area of the major surfaces of certain pairs of coils increases from the line to the neutral end of the winding, and the ratio of solid to fluid electrical insulation decreases from coil to coil in proportion to the increased effective adjacent areas between adjacent coils, providing substantially the same capacitance between each pair of adjacent coils.

6. The electrical winding of claim 1 including magnetic core means, said plurality of electrical coils being disposed in inductive relation with said magnetic core means, the clearances from certain of said coils to said magnetic core means decreasing from the line to the neutral end of the winding, increasing the effective adjacent area of the major surfaces of certain pairs of adjacent coils from the line to the neutral end of the winding.

7. The electrical winding of claim 6 wherein the ratio of solid to fluid electrical insulating means changes from coil to coil in proportion to the increased effective adjacent areas between adjacent coils, to provide predetermined capacitances between adjacent coils.

8. The electrical winding of claim 6 wherein the dielectric constant of said solid electrical insulating means is greater than the dielectric constant of said fluid electrical insulating means, and the ratio of solid electrical insulation to fluid electrical insulation decreases across the winding from the line to the neutral end, in proportion to the increased effective adjacent areas between adjacent coils, from the line to the neutral end of the winding.

References Cited

UNITED STATES PATENTS 2,993,183  7/1961  Moore et al. _____ 336—70 X
3,183,460  5/1965  Benson _____ 336—70 X LARAMIE E. ASKIN, *Primary Examiner.*

T. J. KOZMA, *Assistant Examiner.*